United States Patent
Bewlay et al.

(10) Patent No.: US 6,565,990 B2
(45) Date of Patent: May 20, 2003

(54) BONDED NIOBIUM SILICIDE AND MOLYBDENUM SILICIDE COMPOSITE ARTICLES AND METHOD OF MANUFACTURE

(75) Inventors: Bernard Patrick Bewlay, Schenectady, NY (US); Melvin Robert Jackson, Niskayuna, NY (US); Ji-Cheng Zhao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/867,643

(22) Filed: May 30, 2001

(65) Prior Publication Data

US 2002/0182070 A1 Dec. 5, 2002

(51) Int. Cl.$^7$ .......................... B32B 15/00; B23K 31/02
(52) U.S. Cl. ................. 428/662; 228/193; 228/194; 228/195; 228/227; 228/262.8; 416/223 R; 416/241 R; 428/636; 428/656; 428/660; 428/663; 428/666; 428/668; 428/669; 428/670; 428/672; 428/941
(58) Field of Search ........................ 428/662, 636, 428/656, 660, 663, 666, 668, 669, 670, 672, 941; 228/193, 194, 195, 227, 262.8; 416/223 R, 241 R

(56) References Cited

U.S. PATENT DOCUMENTS

| | | | |
|---|---|---|---|
| 3,633,110 A | 1/1972 | Sullivan et al. | |
| 3,736,638 A | 6/1973 | Stone, Jr. | |
| 3,909,917 A | * 10/1975 | Lebedev et al. | ............ 228/227 |
| 4,611,752 A | 9/1986 | Jahnke | |
| 4,642,863 A | 2/1987 | Schulz | |
| 5,071,059 A | 12/1991 | Heitman et al. | |
| 5,072,871 A | 12/1991 | Moracz et al. | |
| 5,099,573 A | 3/1992 | Krauss et al. | |
| 5,626,462 A | 5/1997 | Jackson et al. | |
| 5,640,767 A | 6/1997 | Jackson et al. | |
| 5,820,337 A | 10/1998 | Jackson et al. | |

* cited by examiner

Primary Examiner—Robert R. Koehler
(74) Attorney, Agent, or Firm—Robert P. Santandrea

(57) ABSTRACT

An airfoil having a melting temperature of at least about 1500° C. and comprising a first piece and a second piece joined at a bonded region to the first piece by a diffusion bond. The first piece comprises one of a first niobium-based refractory metal intermetallic composite and a first molybdenum-based refractory metal intermetallic composite. The second piece comprises one of a second niobium-based refractory metal intermetallic composite and a second molybdenum-based refractory metal intermetallic composite. The diffusion bond is formed from a first metallic element disposed on a first surface of the first piece and a second metallic element disposed on at least one of the first surface and a second surface of the second piece, the second surface contacting the first surface, wherein the first and second metal form a composition having a melting temperature less than about 1400° C. This abstract is submitted in compliance with 37 C.F.R. 1.72(b) with the understanding that it will not be used to interpret or limit the scope of or meaning of the claims.

49 Claims, 3 Drawing Sheets

BONDED NIOBIUM SILICIDE AND MOLYBDENUM SILICIDE COMPOSITE ARTICLES AND METHOD OF MANUFACTURE

BACKGROUND OF THE INVENTION

This application generally relates to composite articles that are joined together at a bonded region. More particularly, the invention described herein relates to bonded niobium-based silicide and molybdenum-based silicide composite articles that are joined together at a bonded region by a diffusion bond.

Nickel (Ni)-based superalloys have been used as jet engine materials for many years. The surface temperatures at the hottest locations of state-of-the-art jet engine turbine airfoils now approach 1,150° C., which is approximately 85% of the melting temperatures of Ni-based superalloys. Niobium (Nb) and molybdenum (Mo) based refractory metal intermetallic composites (hereinafter referred to as "Nb-based RMICs" and "Mo-based RMICs,") have much higher potential application temperatures, provided that they can be used at approximately 80% or more of their melting temperatures, which are generally greater than about 1700° C.

Complex silicide-based RMICs that are made from Nb—Si—Ti—Hf—Cr—Al alloys or Mo—Si—B—Cr alloys appear to have the potential to become the next generation turbine materials with a long term, high-temperature capability that is significantly higher than that of current Ni-based superalloys. Because of their high melting temperatures, however, direct casting of hollow engine components with cooling channels from these Nb- and Mo-based RMICs is expected to be very difficult. At such high temperatures, very few materials can serve as casting cores and molds without experiencing creep, cracking, or reactions with the molten metals and thus contaminating the melt and degrading the cores. One potential alternative technique for the manufacture of complex-shaped components (e.g. airfoils) with cooling channels is to bond together, typically using brazes, two or more structural members that have been machined to the appropriate shapes. Currently, however, no such braze materials exist for these Nb- and Mo-based RMICs.

It is known in the art to make hollow components, such as turbine blades, by joining and bonding halves or multiple pieces together. However, the prior-art braze materials that have been developed for Ni-based or Fe-based alloys are not suitable for use with the new Nb- and Mo-based RMICs, which have very different alloy compositions and much higher working temperatures. Detrimental interactions are known to occur between nickel brazes, for example, and Nb-based RMICs.

Accordingly, there is a need in the art for improved high temperature composite articles that are may be formed by joining together multiple pieces.

BRIEF SUMMARY OF THE INVENTION

The present invention meets this and other needs by providing articles formed from Nb- and Mo-based RMICs that are joined together at a bonded region by a diffusion bond.

Accordingly, one aspect of the invention is to provide an article having a bulk melting temperature of at least about 1500° C. The article comprises a first piece and a second piece joined at a local bonded region to the first piece by a diffusion bond. The first piece comprises one of a first Nb-based RMIC and a first Mo-based RMIC, wherein the first Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron.

A second aspect of the invention is to provide an airfoil having a bulk melting temperature of at least about 1500° C. The airfoil comprises a first piece and a second piece joined at a local bonded region to the first piece by a diffusion bond. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein said second Nb-based RMIC comprises titanium, hafnium, silicon, chromium, and niobium, and the second Mo-based RMIC comprises molybdenum, silicon, and at least one of chromium and boron.

A third aspect of the invention is to provide an airfoil having a bulk melting temperature of at least about 1500° C. and comprising a first piece and a second piece joined at a local bonded region to the first piece by a diffusion bond. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron. The diffusion bond is formed from a first metallic element disposed on a first surface of the first piece and a second metal disposed on at least one of the first surface and a second surface of the second piece, the second surface contacting the first surface, wherein the first and second metal form a composition having a melting temperature less than about 1430° C.

A fourth aspect of the invention is to provide a turbine assembly having at least one component having a bulk melting temperature of at least about 1500° C. and comprising a first piece and a second piece joined at a local bonded region to the first piece by a diffusion bond. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron. The diffusion bond is formed from a first metallic element disposed on a first surface of the first piece and a second metal disposed on at least one of the first surface and a second surface of the second piece, the second surface contacting the first surface, wherein the first and second metal form a composition having a melting temperature less than about 1430° C.

Finally, a fifth aspect of the invention is to provide a method of making an article having a bulk melting temperature of at least about 1500° C. and comprising a first piece and a second piece that are joined together at a local bonded region by a diffusion bond. The first piece and second piece each comprise one of a Nb-based RMIC and a Mo-based RMIC, wherein the Nb-based RMIC comprises titanium, hafnium, silicon, chromium, and niobium and the Mo-based RMIC comprises molybdenum, silicon, and at least one of chromium and boron. The method comprises the steps of: providing the first piece and the second piece; depositing a first metallic element onto a first surface of the first piece to form a first coated surface; depositing a second metallic element onto at least one of the first surface and a second surface of the second piece to form a second coated surface, wherein the first metal and the second metal are capable of forming a composition having a melting temperature less than about 1430° C.; contacting the first coated surface with the second coated surface to form an interface between the first piece and the second piece; heating the first piece, the second piece, the first coated surface, and the second coated surface to a first temperature for a first predetermined hold time, the first temperature being at least 20° C. above the melting temperature; and further heating the first piece, the second piece, the first coated surface, and the second coated surface to a temperature between about 1300° C. and about 1450° C. for a second predetermined hold time, thereby joining the first piece and the second piece at the interface and forming the article.

These and other aspects, advantages, and salient features of the present invention will become apparent from the following detailed description, the accompanying drawings, and the appended claims.

LIST OF FIGURES

DETAILED DESCRIPTION OF THE INVENTION

Figure 1:
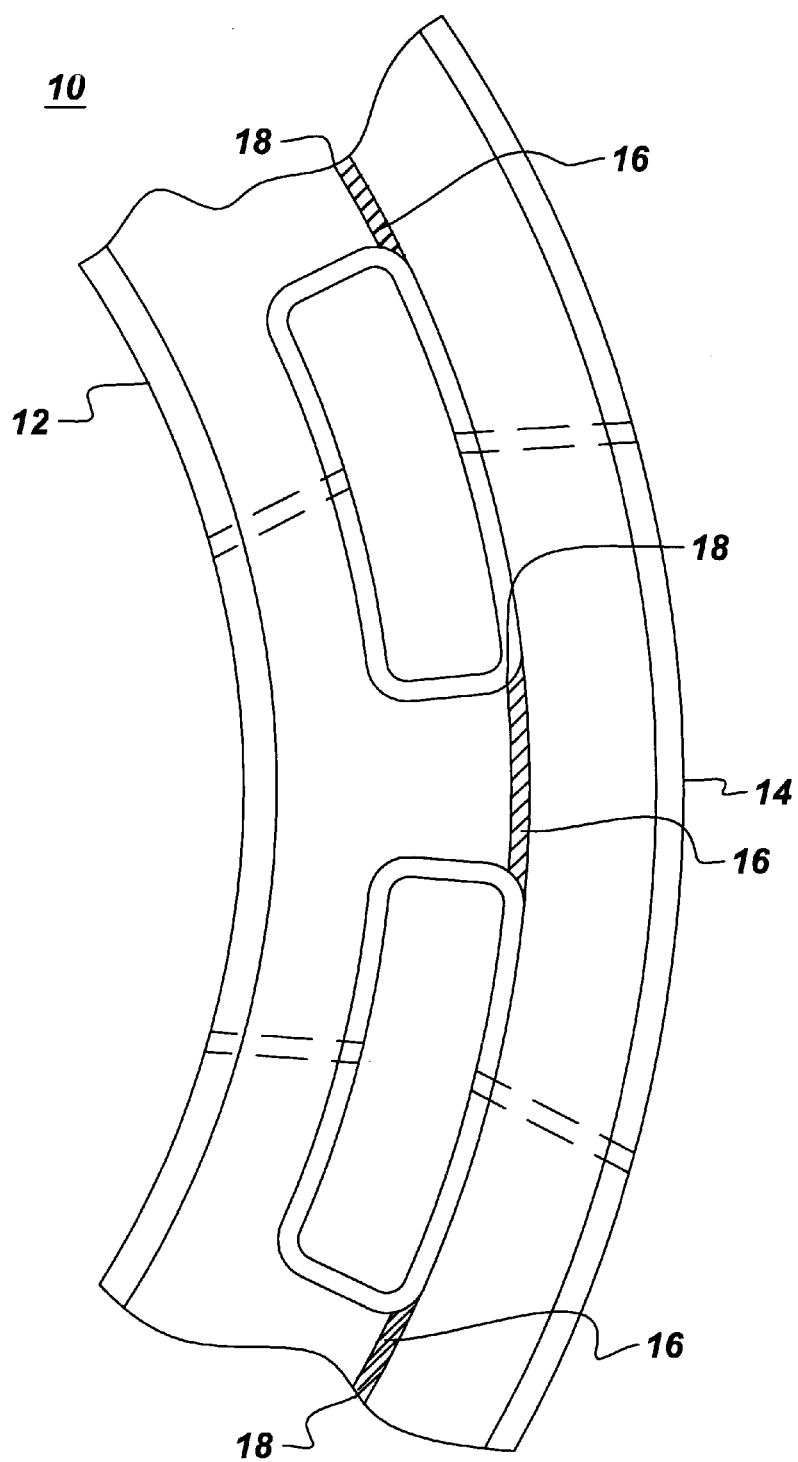
FIG. 1 is a schematic illustration of a brazed article in accordance with one embodiment of the present invention.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto.

An article 10, such as an airfoil, that is adapted for exposure to high-temperature conditions, typically greater than about 1000° C., includes a first piece 12 and a second piece 14, as shown in FIG. 1. In an exemplary embodiment, article 10 is an airfoil, for example a double-walled airfoil, for use within a hot gas path of a turbine assembly. Article 10 may be a component, such as a diffuser, casing, seal ring structure, or the like that is intended for use in a turbine assembly or any other structure in which temperatures in excess of about 1000° C. are encountered. Article 10 has a bulk melting temperature of at least about 1500° C. Preferably, article 10 has a bulk melting temperature of at least about 1700° C.

First piece 12 is made of a first niobium based refractory metal intermetallic composite (hereinafter referred to as "Nb-based RMIC") or a first molybdenum silicide based refractory metal intermetallic composite (hereinafter referred to as "Mo-based RMIC"). The first Nb-based RMIC typically comprises titanium, hafnium, silicon, chromium, and niobium and first Mo-based RMIC typically comprises molybdenum, silicon, and at least one of chromium and boron.

Second piece 14 is joined by a diffusion bond 16 to first piece 12. Second piece 14 is made of a second Nb-based RMIC or a second Mo-based RMIC. The second Nb-based RMIC typically comprises titanium, hafnium, silicon, chromium, and niobium, and the second Mo-based RMIC typically comprises molybdenum, silicon, and at least one of chromium and boron.

The Nb-based RMICs that are used to form the article 10 of the present invention possess a good balance of oxidation resistance and mechanical properties. The Nb-based RMICs preferably have compositions in the range of: between about 20 and about 30 atomic percent titanium; between about 13 and about 20 atomic percent silicon; between about 2 and about 10 atomic percent hafnium; between about 1 and about 12 atomic percent chromium; between about 1 and about 3 atomic percent aluminum; and between about 5 and about 7 atomic percent boron; with the balance comprising niobium. In order to provide even greater oxidation resistance, these alloys may optionally contain greater amounts of chromium and aluminum. In addition, the Nb-based RMICs may further include up to about 4 atomic percent Ge, and up to about 6 atomic percent each of Mo, Ta, V, W, Fe, Sn, and Zr.

In the present invention, the Mo-based RMICs that are used to form the article 10 are based on molybdenum suicides, such as, but not limited to, $MoSi_2$, $Mo_3Si$, $Mo_5Si_3$, and $Mo_5SiB_2$ and comprise molybdenum, silicon, and at least one of boron or chromium. The Mo-based RMICs preferably comprise between about 2.5 and about 13.5 atomic percent silicon, between about 3.5 and about 26.5 atomic percent boron, and a balance of molybdenum. Alternatively, the Mo-based RMICs may comprise between about 13 and about 16 atomic percent silicon, between about 25 and about 40 atomic percent chromium, and a balance of molybdenum. The Mo-based RMICs may also include other elements, such as, but not limited to, tantalum, titanium, zirconium, rhenium, carbon, hafnium, germanium, tungsten, vanadium, tin, and aluminum.

The joints formed by diffusion bond 16 at interface 18 in article 10 must sustain thermal, axial/centrifugal, and pressure differential stresses. In an airfoil, for example, the gas path side of the article (formed by second piece 14 in FIG. 1) may experience temperatures of about 1315° C., whereas the cold side (formed by first piece 12 in FIG. 1) may only reach about 1000° C. Both steady-state and transient (occurring during aircraft takeoffs and landings) thermal stresses act upon the bonding surfaces in a shear mode. The pressure differential between the gas path side and the cold side can be as high as about 0.1 ksi, and it will exert ballooning, or tensile, stresses on the bonding surfaces at interface 18. In addition, the airfoils also produce centrifugal stresses during rotation that act upon the bonding surface in a shear mode. The combined stresses acting on the bonding surfaces can be very significant at the potentially high operating temperatures. The joints formed by diffusion bond 16 at interface 18 must be able to withstand such stresses.

The interaction between materials that are used to form the diffusion bond 16, first piece 12, and second piece 14 must also be considered. The diffusion bond 16 must not significantly degrade the properties of the Nb- and/or Mo-based RMICs that form first piece 12 and second piece 14. Moreover, diffusion bond 16 must have sufficient oxidation and environmental resistance to avoid internal oxidation during the brazing and subsequent homogenization, or diffusion bonding, processes.

Temperature regimes for the bonding operations also impose constraints on the selection of materials that are used to form the diffusion bond 16 for joining first piece 12 and second piece 14. Preferably, diffusion bonding of first piece 12 and second piece 14 occurs at temperatures below about 1450° C., as bonding of first piece 12 and second piece 14 at temperatures higher than about 1450° C. requires expensive tooling and fixtures that may not be able to produce an article 10 that has the required precision in dimensions. In addition, internal oxidation becomes a severe threat to forming good bonds at higher temperatures. On the other hand, when any of the materials that are used to form the diffusion bond 16 has a melting temperature below the potential operating temperatures (e.g., about 1000° C.) of article 10, care must be taken to ensure that low melting compositions of braze 16 with either first piece 12 or second piece 14 do not exist after homogenization of the interface.

Figure 2:
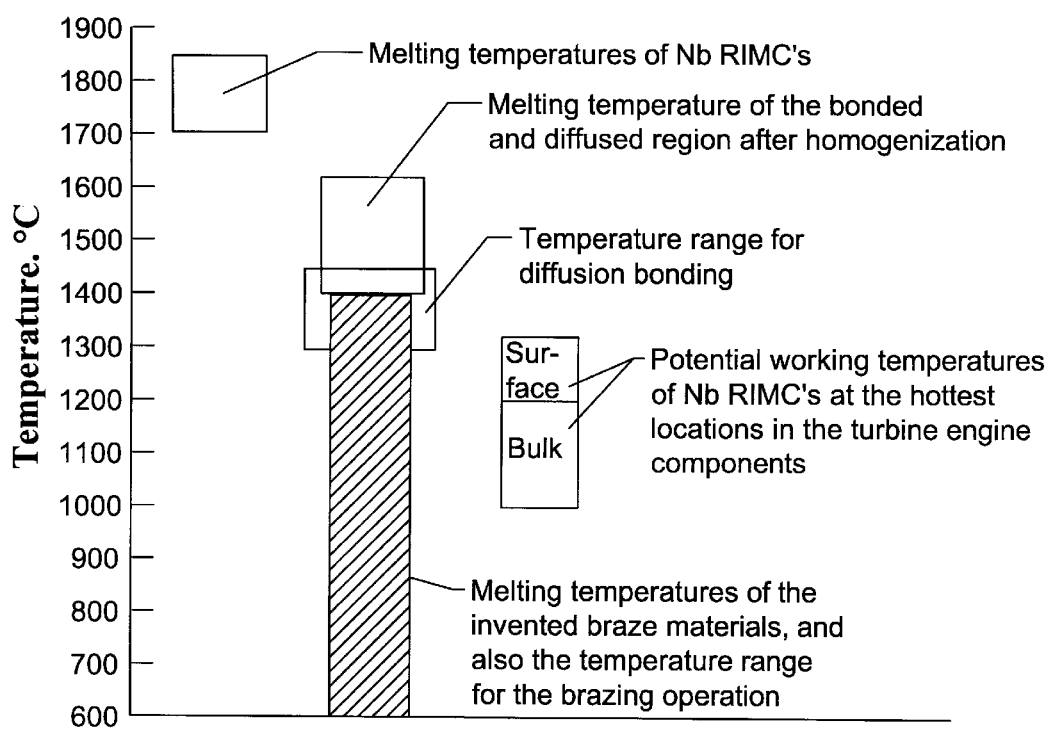
FIG. 2 is a plot of approximate temperature regimes of the brazing and homogenization operations relative to the melting temperatures and the potential working temperatures of Nb- and Mo-based RIMCs.

Interdiffusion of elements from the materials that are used to form the diffusion bond 16 into first piece 12 and second piece 14 enhances joining of first piece 12 and second piece 14. Thus, the solubility of the elements in the materials that are used to form the diffusion bond 16 in the Nb-based and/or Mo-based RMICs must also be taken into account. After bonding and homogenization, the bonded and diffused regions of article 10 preferably has melting temperatures of at least about 1450° C. In service, joints formed by diffusion bond 16 at interface 18 in article 10 are exposed to temperatures that are close to the bulk temperature of article 10, or up to about 1000° C., rather than the temperature of up to about 1315° C. that is experienced by the surface (formed by second piece 14 in FIG. 1) of article 10. The approximate temperature regimes of the brazing and homogenization operations relative to the melting temperatures and the potential working temperatures of Nb-and Mo-based RMICs are summarized in FIG. 2.

First piece 12 and second piece 14 are usually joined by brazing. The brazing operation may be carried out by sandwiching a braze foil, powder paste, or powder tape with a specified composition between first piece 12 and second piece 14, which have been machined to the appropriate shapes in a fixture. The first piece 12, second piece 14, and braze are heated to a brazing temperature for a predetermined hold time, and then heated to a higher temperature to allow a diffusion bond to form between first piece 12 and second piece 14.

In the present invention, however, article 10 is formed by a creating a diffusion bond between first piece 12 and second piece 14 without the use of braze foils, powder tapes, or powder pastes. Two pure elements, which are preferably metals, are first coated onto at least one of a first surface of first piece 12 and a second surface of second piece 14. A first element may be deposited on the first surface and the second element may be deposited on the second surface. Alternatively, both the first element and second element may be deposited on one of the first and second surfaces. In this case, first and second elements may be either be co-deposited simultaneously or deposited successively to form a layer-like structure. The thickness of each coating is between about 10 microns and about 100 microns, with the second element comprising between about 30 and about 70 atomic percent of the deposited material. Deposition methods that are widely known in the art, such as, but are not limited to, electroplating, sputtering, chemical vapor deposition (CVD), plasma enhanced or assisted chemical vapor deposition (PECVD), physical vapor deposition (PVD), and the like are used to deposit the elements on at least one of the first surface and second surface. It will be readily understood by those skilled in the art that predetermined values of both coating thicknesses and overall composition of the coatings can be obtained by controlling the operating parameters of the particular method that is selected to deposit the coatings.

Once coated, the first surface and second surface are brought into contact with each other to permit diffusion bonding of first piece 12 to second piece 14. First piece 12 and second piece 14 are then heated to a temperature that is at least about 20° C. above the melting temperature of the composition of the coating, thereby forming a transient liquid phase comprising the first element and second element. The melting temperature of the composition of the coating is preferably less than about 1430° C. It will be appreciated by those skilled in the art that, given the approximate composition of the deposited coating, the approximate melting temperature of the coating can be readily ascertained. The transient liquid phase diffuses into the first piece 12 and second piece 14, where it is consumed, thus causing the interface 18 between the first piece 12 and second piece 14 to solidify. First piece 12 and second piece 14 are then heated to between about 1300° C. and about 1450° C. to form a local bonded region at interface 18. The local bonded region has a melting temperature of at least about 1450° C.

The joining method of the present invention eliminates the need to prepare braze foils, braze powder tapes, or powder pastes that are used in traditional brazing operations. In addition, the joining method of the present invention may provide an article, such as an airfoil, that possesses better dimensional tolerance than similar articles joined by traditional brazing means.

When bonding of first piece 12 and second piece 14 is carried out at temperatures of at least about 1450° C., expensive tooling and fixtures that may not be able to produce article 10 having the required dimensional precision are usually required. In the joining method of the present invention, the melting temperature of the composition of the coating formed by depositing the first and second elements is preferably less than about 1430° C., thus eliminating the need for such high temperature tooling.

To provide the article with sufficient strength and ductility to withstand engine operations, it is preferable that the local bonded region of article 10 have a melting temperature of at least about 1450° C. In order to form a local bond region having a melting temperature in this range, the transient liquid phase is completely consumed by the Nb-based RMICs and/or Mo-based RMICs that form the first piece 12 and second piece 14.

The first element and second element preferably each have a solubility of at least about 5 atomic percent in the Mo-based RMICs and/or Nb-based RMICs that form first piece 12 and second piece 14. The first element and second element may be, but are not limited to, Pd, Pt, Au, Zr, Fe, Ni, Cr, and Co. Binary systems containing these elements contain compositions that have melting temperatures of about 1430° C. or less. Alternatively, first element and second element may be the same element, provided the element has a solubility of at least about 5 atomic percent in the Mo-based RMICs and/or Nb-based RMICs that form first piece 12 and second piece 14 and has a melting temperature of about 1430° C. or less.

By way of example and not intended to limit the invention thereto, chromium and palladium may be deposited on first piece 12 and second piece 14, respectively. Since the Cr—Pd binary system has a melting point at about 1315° C. and about 44 atomic percent Pd, the coated surfaces can be joined together at a temperature between about 1350° C. and about 1450° C.

Figure 3:
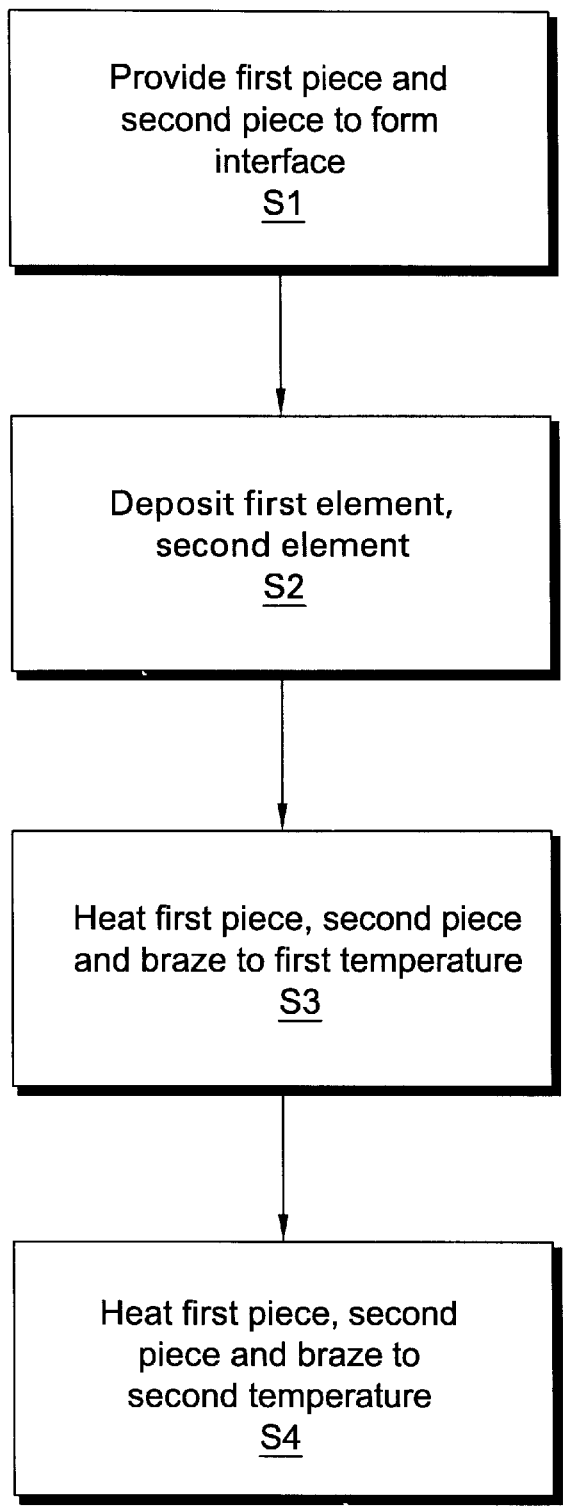
FIG. 3 is a method flow chart in accordance with one embodiment of the present invention.

A method of making article 10 is shown in FIG. 3. First, in step S1, first piece 12 and second piece 14 are provided such that first piece 12 and second piece 14 form an interface 18 therebetween. Next, in step S2, a first metallic element is deposited onto a first surface of the first piece to form a first coated surface, and a second metallic element is deposited onto one of the first surface and a second surface of the second piece to form a second coated surface. Once coated, first surface is contacted with the second surface to form an interface 18 between the first piece 12 and the second piece 14; a first element is provided to interface 18 between first piece 12 and second piece 14. The composition formed by first metallic element and second metallic element preferably has a melting temperature lower than about 1430° C. and comprises between about 30 and about 70 atomic percent of the second element.

Next, at step S3, first piece 12 and second piece 14 are heated to a first temperature for a first predetermined hold time, the first temperature being at least 20° C. above the melting temperature. Next, at step S4, first piece 12 and second piece 14, and braze 16 are further heated to a temperature between about 1300° C. and about 1450° C. for a second predetermined hold time, thereby forming a local bonding region and joining first piece 12 and second piece 14 at interface 18 to form article 10.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. An article having a bulk melting temperature of at least about 1500° C., said article comprising:
   a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
   b) a second piece joined at a local bonded region to said first piece by a diffusion bond, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, wherein said diffusion bond is formed from a first metallic element disposed on a first surface of said first piece and a second metallic element disposed on at least one of said first surface and a second surface of said second piece, said second surface contacting said first surface, wherein said first metallic element and said second metallic element form a composition having a melting temperature less than about 1450° C., and wherein at least about 5 atomic percent of each of said first metallic element and said second metallic element are soluble in each of said first piece and said second piece.

2. The article according to claim 1, wherein each of said first metallic element and said second metallic element is one of palladium, platinum gold, zirconium, iron, nickel, cobalt, and chromium.

3. The article according to claim 1, wherein said first metallic element is chromium and said second metallic element is palladium.

4. The article according to claim 1, wherein said composition comprises between about 30 and about 70 atomic percent of said second metallic element.

5. The article according to claim 1, wherein said first metallic element is deposited onto said first surface and said second metallic element is deposited onto said second surface by one of electroplating, chemical vapor deposition, sputtering, and physical vapor deposition.

6. The article according to claim 1, wherein said bulk melting temperature is at least about 1700° C.

7. The article according to claim 1, wherein said local bonded region has a melting temperature of at least about 1450° C.

8. The article according to claim 1, wherein said first piece comprises said first niobium-based refractory metal intermetallic composite.

9. The article according to claim 8, wherein said second piece comprises said second niobium-based refractory metal intermetallic composite.

10. The article according to claim 1, wherein said first piece comprises said first molybdenum-based refractory metal intermetallic composite.

11. The article according to claim 10, wherein said second piece comprises said second molybdenum-based refractory metal intermetallic composite.

12. The article according to claim 1, wherein said article is one of an airfoil, a diffuser, a casing, and a seal ring structure.

13. The article according to claim 12, wherein said article has a service temperature of at least about 1000° C.

14. An airfoil having a bulk melting temperature of at least about 1500° C., said airfoil comprising:
   a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
   b) a second piece joined at a local bonded region to said first piece by a diffusion bond, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron.

15. The airfoil according to claim 14, wherein said airfoil is a double-walled airfoil.

16. The airfoil according to claim 14, wherein said airfoil is located in a hot gas path of a turbine assembly.

17. The airfoil according to claim 14, wherein said bulk melting temperature is at least about 1700° C.

18. The airfoil according to claim 14, wherein said first piece comprises said first niobium-based refractory metal intermetallic composite.

19. The airfoil according to claim 18, wherein said second piece comprises said second niobium-based refractory metal intermetallic composite.

20. The airfoil according to claim 14, wherein said first piece comprises said first molybdenum-based refractory metal intermetallic composite.

21. The airfoil according to claim 20, wherein said second piece comprises said second molybdenum-based refractory metal intermetallic composite.

22. The airfoil according to claim 14, wherein said local bonded region has a melting temperature of at least about 1450° C.

23. An airfoil having a bulk melting temperature of at least about 1500° C., said airfoil comprising:
   a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
   b) a second piece joined at a local bonded region to said first piece by a diffusion bond, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said diffusion bond is formed from a first metallic element disposed on a first surface of said first piece and a second metallic element disposed on at least one of said first surface and a second surface of said second piece, said second surface contacting said first surface, wherein said first metallic element and said second metallic element form a composition having a melting temperature less than about 1430° C.

24. The airfoil according to claim 23, wherein at least about 5 atomic percent of each of said first metallic element and said second metallic element are soluble in each of said first piece and said second piece.

25. The airfoil according to claim 23, wherein each of said first metallic element and said second metallic element is one of palladium, platinum, gold, zirconium, iron, nickel, cobalt, and chromium.

26. The airfoil according to claim 25, wherein said first metallic element is chromium and said second metallic element is palladium.

27. The airfoil according to claim 23, wherein said composition comprises between about 30 and about 70 atomic percent of said second metallic element.

28. The airfoil according to claim 23, wherein said first metallic element is deposited onto said first surface and said second metallic element is deposited onto said second surface by one of electroplating, chemical vapor deposition, sputtering, and physical vapor deposition.

29. The airfoil according to claim 23, wherein said airfoil is a double-walled airfoil.

30. The airfoil according to claim 23, wherein said airfoil is located in a hot gas path of a turbine assembly.

31. The airfoil according to claim 23, wherein said bulk melting temperature is at least about 1700° C.

32. The airfoil according to claim 23, wherein said first piece comprises said first niobium-based refractory metal intermetallic composite.

33. The airfoil according to claim 32, wherein said second piece comprises said second niobium-based refractory metal intermetallic composite.

34. The airfoil according to claim 23, wherein said first piece comprises said first molybdenum-based refractory metal intermetallic composite.

35. The airfoil according to claim 34, wherein said second piece comprises said second molybdenum-based refractory metal intermetallic composite.

36. The airfoil according to claim 23, wherein said local bonded region has a melting temperature of at least about 1450° C.

37. A turbine assembly having at least one component, said at least one component having a bulk melting temperature of at least about 1500° C. and comprising:
   a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
   b) a second piece joined at a bonded region to said first piece by a diffusion bond, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said diffusion bond is formed from a first metallic element disposed on a first surface of said first piece and a second metallic element disposed on at least one of said first surface and a second surface of said second piece, said second surface contacting said first surface, wherein said first metallic element and said second metallic element form a composition having a melting temperature less than about 1450° C.

38. The turbine assembly according to claim 37, wherein said at least one component is one of an airfoil, a diffuser, a casing, and a seal ring structure.

39. The turbine assembly to claim 37, wherein said at least one component has a service temperature of at least about 1000° C.

40. A method of making an article, the article having a bulk melting temperature of at least about 1500° C. and comprising a first piece and a second piece that are joined at a local bonded region by a diffusion bond, wherein the first piece and second piece each comprise one of a niobium-based refractory metal intermetallic composite and a molybdenum-based refractory metal intermetallic composite, wherein the niobium-based refractory metal intermetallic comprises titanium, hafnium, silicon, chromium, and niobium and the molybdenum-based refractory metal intermetallic composite comprises molybdenum, silicon, and at least one of chromium and boron, the method comprising the steps of:

a) providing the first piece and the second piece;

b) depositing a first metallic element onto a first surface of the first piece to form a first coated surface;

c) depositing a second metallic element onto at least one of the first surface and a second surface of the second piece to form a second coated surface, wherein the first metallic element and the second metallic element are capable of forming a composition having a melting temperature less than about 1450° C.;

d) contacting the first coated surface with the second coated surface to form an interface between the first piece and the second piece;

e) heating the first piece, the second piece, the first coated surface, and the second coated surface to a first temperature for a first predetermined hold time, the first temperature being at least 20° C. above the melting temperature; and f) further heating the first piece, the second piece, the first coated surface, and the second coated surface to a temperature between about 1300° C. and about 1450° C. for a second predetermined hold time, thereby joining the first piece and the second piece at the interface and forming the article.

41. The method of claim 40, wherein the step of depositing a first metallic element onto a first surface of the first piece to form a first coated surface comprises depositing one of palladium, platinum, gold, zirconium, iron, nickel, cobalt, and chromium onto a first surface of the first piece to form a first coated surface.

42. The method of claim 40, wherein the step of depositing a second metallic element onto at least one of said first surface and a second surface of the second piece to form a second coated surface comprises depositing one of palladium, platinum, gold, zirconium, iron, nickel, cobalt, and chromium onto a second surface of the second piece to form a second coated surface.

43. The method of claim 40, wherein the step of depositing a first metallic element onto a first surface of the first piece to form a first coated surface comprises depositing a first metallic element by one of electroplating, chemical vapor deposition, sputtering, and physical vapor deposition onto a first surface of the first piece to form a first coated surface.

44. The method of claim 40, wherein the step of depositing a second metallic element onto at least one of said first surface and a second surface of the second piece to form a second coated surface comprises depositing a second metal by one of electroplating, chemical vapor deposition, sputtering, and physical vapor deposition onto a second surface of the second piece to form a second coated surface.

45. The method of claim 40, wherein at least about 5 atomic percent of each of said first metallic element and said second metallic element are soluble in each of said first piece and said second piece.

46. The method of claim 40, wherein said composition comprises between about 30 and about 70 atomic percent of said second metallic element.

47. The method of claim 40, wherein the article is an airfoil.

48. The method of claim 47, wherein the airfoil is a double-walled airfoil.

49. The method of claim 40, wherein the article has a melting temperature of at least about 1700° C.

* * * * *